(12) United States Patent
Yoshioka et al.

(10) Patent No.: US 8,647,584 B2
(45) Date of Patent: Feb. 11, 2014

(54) ELECTRIC HEATING CATALYST

(75) Inventors: Mamoru Yoshioka, Susono (JP);
Noriaki Kumagai, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/394,825

(22) PCT Filed: Oct. 27, 2010

(86) PCT No.: PCT/JP2010/069094
§ 371 (c)(1),
(2), (4) Date: Mar. 8, 2012

(87) PCT Pub. No.: WO2012/056531
PCT Pub. Date: May 3, 2012

(65) Prior Publication Data
US 2013/0209321 A1    Aug. 15, 2013

(51) Int. Cl.
*F01N 3/10*         (2006.01)
(52) U.S. Cl.
USPC .......................................................... 422/174
(58) Field of Classification Search
USPC ................... 422/174, 177, 180; 392/438, 487
See application file for complete search history.

(56) References Cited

U.S. PATENT DOCUMENTS

| | | | | |
|---|---|---|---|---|
| 5,070,694 | A | * 12/1991 | Whittenberger | ................ 60/300 |
| 5,839,276 | A |   11/1998 | Nishizawa | |
| 5,846,495 | A | * 12/1998 | Whittenberger et al. | ...... 422/180 |
| 5,851,496 | A | * 12/1998 | Sakurai | ......................... 422/174 |
| 5,866,077 | A | *  2/1999 | Sakurai et al. | ................ 422/174 |

FOREIGN PATENT DOCUMENTS

| | | |
|---|---|---|
| GB | 2425073 A * | 10/2006 |
| JP | 5-269387 | 10/1993 |
| JP | 5-96421 | 12/1993 |
| JP | 6-2534 | 1/1994 |
| JP | 8-210127 | 8/1996 |
| JP | 2006-817 | 1/2006 |
| JP | 2006-177346 | 7/2006 |
| JP | 2006-342730 | 12/2006 |
| JP | 2007-117954 | 5/2007 |

* cited by examiner

*Primary Examiner* — Tom Duong
(74) *Attorney, Agent, or Firm* — Finnegan, Henderson, Farabow, Garrett & Dunner, LLP (57) ABSTRACT

The present invention is intended to suppress a reduction in insulation between a heat generation element and a case resulting from PM in an electric heating catalyst. In the electric heating catalyst which has an inner pipe (6a) arranged so as to be located between the heat generation element and the case, a precious metal band (10) is formed on at least either one of an inner peripheral surface and an outer peripheral surface of that portion (6a) of the inner pipe which protrudes from an end face of an insulating support member into an exhaust gas, in such a manner as to extend around on a circumferential surface thereof.

4 Claims, 9 Drawing Sheets

ELECTRIC HEATING CATALYST

CROSS-REFERENCE TO RELATED APPLICATIONS

This application is a national phase application of International Application No. PCT/JP2010/069094, filed Oct. 27, 2010, the contents of which are incorporated herein by reference.

TECHNICAL FIELD

The present invention relates to an electric heating catalyst that is arranged in an exhaust passage of an internal combustion engine.

BACKGROUND ART

In the past, as an exhaust gas purification catalyst arranged in an exhaust passage of an internal combustion engine, there has been developed an electric heating catalyst (hereinafter referred to as an EHC) in which a catalyst is heated by means of a heat generation element which generates heat by electrical energization thereof.

In the EHC, an insulating support member, which serves to support the heat generation element and to insulate electricity, is arranged between the heat generation element which generates heat by electrical energization thereof, and a case in which the heat generation element is received. For example, in Patent Document 1, there is disclosed a technique in which in an EHC, a mat of an insulating material is arranged between a carrier which is electrically energized to generate heat and a case in which the carrier is received.

In addition, in Patent Document 2, there has been disclosed a technique related to a condensation device which causes exhaust gas fine particles to be charged and condensed by generating a corona discharge in an exhaust pipe of an internal combustion engine. The condensation device in Patent Document 2 has an electric conductive part that serves to conduct a high voltage to an electric discharge part, and an insulator part that serves to hold an outer periphery of the electric conductive part. A ring-shaped protrusion portion is formed to protrude from an outer peripheral surface of the insulator part in a diametrical direction thereof, and an oxidation catalyst layer is formed in the protrusion portion.

In Patent Document 3, there is described that in a filter substrate of a catalyst for purification of diesel exhaust gas, an inflow side oxidation catalyst coat layer, which includes at least one kind of substance selected from alkali metals and alkaline earth metals, is formed on a cell partition surface at the side of an inflow side cell, and an outflow side oxidation catalyst coat layer, which does not include an alkali metal and an alkaline earth metal, is formed on a cell partition surface at the side of an outflow side cell.

PRIOR ART DOCUMENTS

Patent Documents

Patent Document 1: Japanese patent application laid-open No. H05-269387
Patent Document 2: Japanese patent application laid-open No. 2006-342730
Patent Document 3: Japanese patent application laid-open No. 2007-117954

SUMMARY OF THE INVENTION

Problem to be Solved by the Invention

In addition, in the exhaust pipe or in the case of the EHC, condensed water may be generated due to condensation of the moisture in the exhaust gas. If the condensed water permeates into the insulating support member, there is a fear that the heat generation element and the case may be short circuited to each other through the condensed water. Accordingly, in the EHC, an inner pipe may be provided which is sandwiched or clamped by the insulating support member in such a manner as to locate between the heat generation element and the case. In this case, the inner pipe is formed of a material which insulates electricity and into which the condensed water is difficult to permeate.

By arranging the inner pipe in such a manner, the condensed water, which has flowed on the inner wall surface of the case and permeated into the insulating support member, is suppressed from reaching up to the heat generation element in the inside of the insulating support member. As a result, the heat generation element and the case are suppressed from being short circuited to each other through the condensed water.

In addition, in the case of the provision of the inner pipe in the EHC, the inner pipe is formed in a manner so as to protrude from an end face of the insulating support member into the exhaust gas. By forming the insulating support member in such a manner, the condensed water, which has flowed on the inner wall surface of the case and reached the insulating support member, is suppressed from reaching up to the heat generation element while transmitting through the end face of the insulating support member. Accordingly, it is possible to suppress the short circuit between the heat generation element and the case through the condensed water on the end face of the insulating support member.

However, if such an inner pipe is provided, particulate matter (hereinafter referred to as PM) in the exhaust gas will adhere to and accumulate or deposit on the protrusion portion which protrudes from the end face of the insulating support member in the inner pipe. Because the PM has conductivity, when the PM deposits on the protrusion portion of the inner pipe, there is a possibility that the insulation between the heat generation element and the case may be reduced.

The present invention has been made in view of such problems as referred to above, and has for its object to suppress a reduction in insulation between a heat generation element and a case resulting from PM in an EHC.

Means for Solving the Problem

The present invention resides in an EHC which has an inner pipe arranged so as to be located between a heat generation element and a case, wherein a precious metal band is formed on at least either one of an inner peripheral surface and an outer peripheral surface of that portion of the inner pipe which protrudes from an end face of an insulating support member into an exhaust gas in such a manner as to extend around on a circumferential surface thereof.

More specifically, an EHC according to the present invention is provided with:

a heat generation element that is electrically energized to generate heat so that a catalyst is heated by the generation of heat;

a case that receives said heat generation element therein;

an insulating support member that is arranged between said heat generation element and said case for supporting said heat generation element and insulating electricity;

an inner pipe that is a tubular member formed of a material which insulates electricity and which is more resistant to water permeation than said insulating support member, said inner pipe being arranged so as to be located between said heat generation element and said case, said inner pipe having an end protruding from an end face of said insulating support member into an exhaust gas; and a precious metal band that is formed on at least either one of an inner peripheral surface and an outer peripheral surface of that portion of said inner pipe which protrudes from the end face of said insulating support member into the exhaust gas, by coating thereon precious metal in a band-shaped manner so as to extend around on a circumferential surface thereof.

In the EHC according to the present invention, the inner pipe, which is located between the heat generation element and the case, is arranged by being inserted in the insulating support member, or by being inserted or sandwiched between an inner wall surface of the case and the insulating support member. In addition, the end of the inner pipe protrudes from the end face of the insulating support member into the exhaust gas. In the following, that portion of the inner pipe which protrudes from the end face of the insulating support member into the exhaust gas is referred to as a "protrusion portion".

In addition, the precious metal band is formed on at least either one of the inner peripheral surface and the outer peripheral surface of the protrusion portion of the inner pipe in such a manner as to extend around on the circumferential surface thereof. Active oxygen is generated on the precious metal band. The PM deposited on the precious metal band is oxidized by the active oxygen. Further, by means of the active oxygen, there can also be oxidized the PM which has been deposited on the inner peripheral surface or the outer peripheral surface of the protrusion portion of the inner pipe at a location in the vicinity of the precious metal band. As a result, it is possible to suppress the PM from depositing over the entire surfaces of the end face of the insulating support member, and the inner peripheral surface and the outer peripheral surface of the protrusion portion of the inner pipe. Thus, according to the present invention, it is possible to suppress a reduction in the insulation between the heat generation element and the case resulting from the PM.

In the present invention, the precious metal band may be formed in plurality on at least either one of the inner peripheral surface and the outer peripheral surface of the protrusion portion of the inner pipe. In this case, the plurality of precious metal bands are formed at such intervals that electrical insulation between adjacent precious metal bands can be ensured.

As described above, in the present invention, not only the PM deposited on the precious metal bands but also the PM deposited at locations in the vicinity of the precious metal bands are oxidized by the active oxygen generated on the precious metal bands. As a result, by arranging the precious metal bands in plurality, it becomes possible to ensure a longer creepage distance for insulation.

Here, note that in cases where three or more precious metal bands are arranged on the inner peripheral surface or the outer peripheral surface of the protrusion portion of the inner pipe, the intervals between the adjacent precious metal bands may not necessarily be constant as long as they can ensure electrical insulation therebetween.

In the EHC according to the present invention, in cases where the inner pipe has its ends protruding respectively from both the upstream side and the downstream side end faces of the insulating support member into the exhaust gas, a precious metal band is provided on each of the upstream side protrusion portion and the downstream side protrusion portion of the inner pipe. Here, note that the temperature of the exhaust gas which flows into the EHC is lower as compared with the temperature of the exhaust gas which flows out of the EHC. Therefore, in the upstream side protrusion portion of the inner pipe, the PM deposited thereon is more difficult to be oxidized as compared with that on the downstream side protrusion portion.

Accordingly, the precious metal band formed on the upstream side protrusion portion may be formed of a precious metal which is higher in activity than a precious metal which forms the precious metal band formed on the downstream side protrusion portion. According to this, it is possible to carry out the oxidization of the PM deposited on the upstream side protrusion portion in a more facilitated manner.

In the above-mentioned case, for example, in the upstream side protrusion portion, the precious metal band may be formed of a platinum based metal, whereas in the downstream side protrusion portion, the precious metal band may be formed of Ag. According to the platinum based metal, the PM can be oxidized not only by the active oxygen but also by the oxygen generated at the time of reducing the NOx in the exhaust gas. Accordingly, it is possible to facilitate the oxidization of the PM deposited on the upstream side protrusion portion in a more effective manner. In addition, in the downstream side protrusion portion, the precious metal band is formed of Ag, whereby the reduction of cost can be attained, as compared with the case where the precious metal bands are formed of the platinum based metal in both of the upstream side and downstream side protrusion portions.

Advantageous Effect of the Invention

According to the present invention, it is possible to suppress a reduction in the insulation between the heat generation element and the case resulting from PM in the EHC.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

Embodiment

Schematic Construction of an EHC

Figure 1:
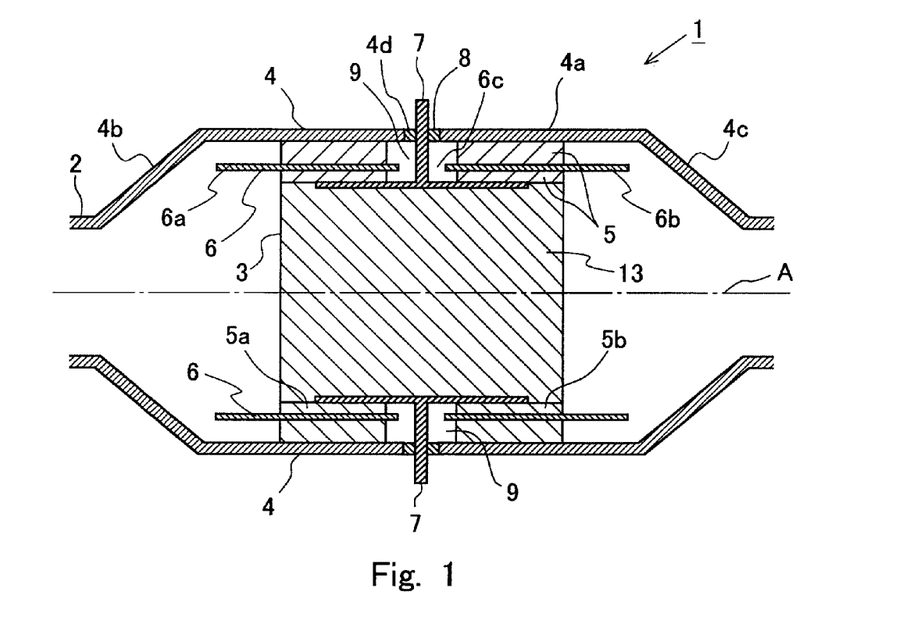
FIG. 1 is a view showing the schematic construction of an electric heating catalyst (EHC) according to a first embodiment of the present invention.
Figure 2:
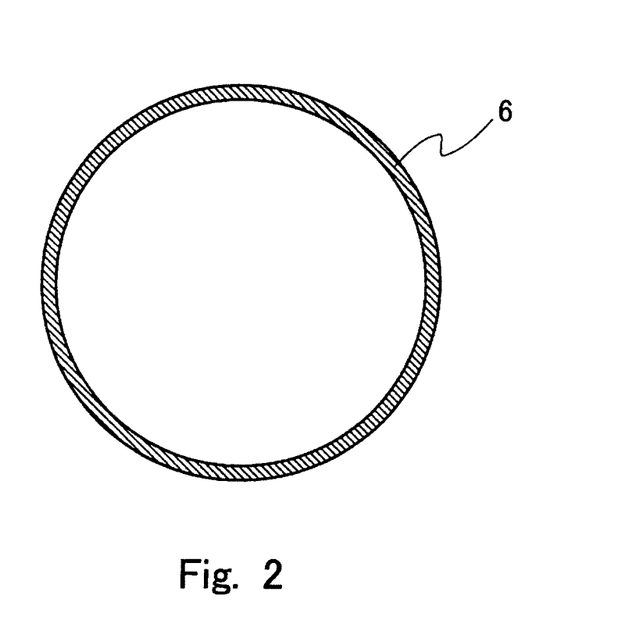
FIG. 2 is a view showing a sectional shape of an inner pipe in a direction crossing a central axis thereof at right angles according to the first embodiment.
Figure 3:
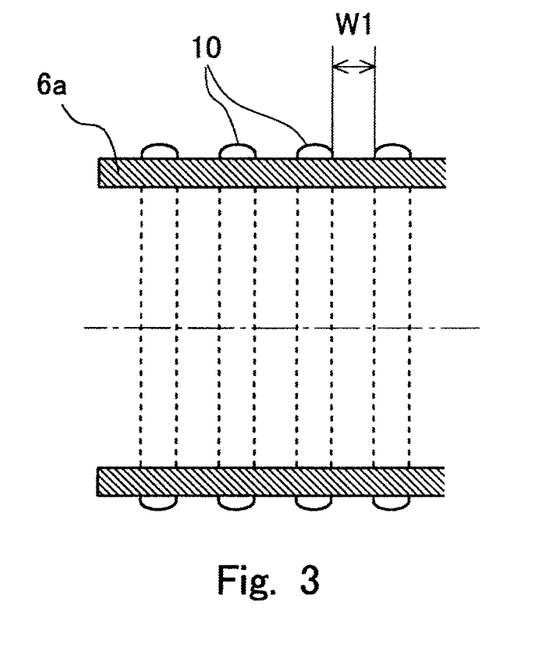
FIG. 3 is a view showing the schematic construction of a protrusion portion at an upstream side of the inner pipe according to the first embodiment.

FIGS. 1 through 3 are views each showing the schematic construction of an electric heating catalyst (EHC) according to this first embodiment of the present invention. The EHC 1 according to this embodiment is arranged in an exhaust pipe of an internal combustion engine mounted on a vehicle. The internal combustion engine may be a diesel engine, or may be a gasoline engine. In addition, the EHC 1 according to this embodiment can also be used in a vehicle which adopts a hybrid system equipped with an electric motor.

The EHC 1 according to this embodiment is provided with a catalyst carrier 3, a case 4, a mat 5, an inner pipe 6, and electrodes 7. The catalyst carrier 3 is formed in the shape of a circular cylinder, and is arranged in such a manner that a central axis thereof is in alignment with a central axis A of an exhaust pipe 2. An exhaust gas purification catalyst 13 is carried or supported by the catalyst carrier 3. As the exhaust gas purification catalyst 13, there can be exemplified an oxidation catalyst, an NOx storage reduction catalyst, an NOx selective reduction catalyst, a three-way catalyst, and so on.

The catalyst carrier 3 is formed of a material which, when energized, becomes an electric resistance to generate heat. As a material for the catalyst carrier 3, there can be exemplified SiC. The catalyst carrier 3 has a plurality of passages which extend in a direction in which an exhaust gas flows (i.e., the direction of the central axis A), and which have a cross section of honeycomb shape vertical to the direction in which the exhaust gas flows. The exhaust gas flows through these passages. Here, note that the cross sectional shape of the catalyst carrier 3 in the direction orthogonal to the central axis A may be elliptical, etc. The central axis A is a central axis common to the exhaust pipe 2, the catalyst carrier 3, the inner pipe 6, and the case 4.

The catalyst carrier 3 is received in the case 4. An electrode chamber 9 is formed in the case 4. Here, note that the details of the electrode chamber 9 will be described later. One pair of electrodes 7 are connected to the catalyst carrier 3 through the electrode chamber 9 from right and left directions. Electricity is supplied to the electrodes 7 from a battery (not shown). When electricity is supplied to the electrodes 7, the catalyst carrier 3 is electrically energized. When the catalyst carrier 3 generates heat by energization thereof, the exhaust gas purification catalyst 13 supported by the catalyst carrier 3 is heated, so that the activation thereof is facilitated.

The case 4 is formed of metal. As a material which forms the case 4, there can be exemplified a stainless steel material. The case 4 has a reception portion 4a which is constructed to include a curved surface parallel to the central axis A, and tapered portions 4b, 4c which serve to connect the reception portion 4a and the exhaust pipe 2 with each other at an upstream side and a downstream side, respectively, of the reception portion 4a. The reception portion 4a has a passage cross sectional area which is larger than that of the exhaust pipe 2, and the catalyst carrier 3, the mat 5 and the inner pipe 6 are received in the inside of the reception portion 4a. The tapered portions 4b, 4c each take a tapered shape of which the passage cross sectional area decreases in accordance with the increasing distance thereof from the reception portion 4a.

The mat 5 is inserted between an inner wall surface of the reception portion 4a of the case 4, and an outer peripheral surface of the catalyst carrier 3. In other words, inside the case 4, the catalyst carrier 3 is supported by the mat 5. In addition, the inner pipe 6 is inserted in the mat 5. FIG. 2 is a view showing the sectional shape of the inner pipe 6 in a direction crossing the central axis A at right angles. As shown in FIGS. 1 and 2, the inner pipe 6 is a pipe-shaped member having its center on the central axis A. The mat 5 is arranged to sandwich or clamp the inner pipe 6 therein, whereby it is divided into a portion at the side of the case 4 and a portion at the side of the catalyst carrier 3 by means of the inner pipe 6.

The mat 5 is formed of an electric insulation material. As a material which forms the mat 5, there can be exemplified a ceramic fiber which includes alumina as a main component. The mat 5 is wound around the outer peripheral surface of the catalyst carrier 3 and the outer peripheral surface of the inner pipe 6. In addition, the mat 5 is divided into an upstream side portion 5a and a downstream side portion 5b, and a space is formed between the upstream side portion 5a and the downstream side portion 5b. Due to the insertion of the mat 5 between the catalyst carrier 3 and the case 4, it is possible to suppress electricity from flowing into the case 4 at the time when the catalyst carrier 3 is electrically energized.

The inner pipe 6 is formed of an electrically insulating material. Moreover, the inner pipe 6 is formed of a material which is more resistant to water permeation than the mat 5. Alumina can be exemplified as a material which forms the inner pipe 6. As shown in FIG. 1, the inner pipe 6 has a length in the direction of the central axis A longer than that of the mat 5. As a result, the inner pipe 6 has an upstream side end and a downstream side end thereof protruded from an upstream side end face and a downstream side end face of the mat 5, respectively. In the following, those portions 6a, 6b of the inner pipe 6 which protrude from the end faces of the mat 5 into the exhaust gas are referred to as "protrusion portions".

The case 4 and the inner pipe 6 have through holes 4d, 6c opened therein so as to allow the electrodes 7 to pass them, respectively. Then, the electrode chamber 9 is formed by a space between the upstream side portion 5a and the downstream side portion 5b of the mat 5 in the case 4. In other words, in this embodiment, the electrode chamber 9 is formed over the entire circumference of the outer peripheral surface of the catalyst carrier 3 between the upstream side portion 5a and the downstream side portion 5b of the mat 5.

Electrode support members 8, which serve to support the electrodes 7, respectively, are arranged in the through holes 4d which are opened in the case 4. These electrode support members 8 are each formed of an electrically insulating material, and are fitted with no gap between the case 4 and the electrodes 7.

Here, the construction of the protrusion portions 6a, 6b of the inner pipe 6 according to this embodiment will be explained. FIG. 3 is an enlarged view showing the schematic construction of the upstream side protrusion portion 6a of the inner pipe 6. Here, note that the downstream side protrusion portion 6b of the inner pipe 6 also has the same construction.

In this embodiment, the protrusion portion 6a of the inner pipe 6 is formed with precious metal bands 10 which extend around on the outer peripheral surface thereof. The precious metal bands 10 are formed by coating a precious metal (Pt, Ag, etc.) on the outer peripheral surface of the protrusion portion 6a in a band-shaped manner so as to extend around on the circumferential surface thereof.

In addition, the intervals between the adjacent precious metal bands 10 are set to be a predetermined interval W1, as shown in FIG. 3. Here, the predetermined interval W1 is an interval which is equal to or larger than a lower limit value of an interval which can ensure electrical insulation between the adjacent precious metal bands 10. Here, note that the intervals between the adjacent precious metal bands 10 may not necessarily be an equal interval as long as they can ensure electrical insulation therebetween.

Here, note that in this embodiment, the catalyst carrier 3 corresponds to a heat generation element according to the present invention. However, the heat generation element according to the present invention is not limited to a carrier which supports a catalyst, but instead the heat generation element may be a structure which is arranged at an upstream side of a catalyst, for example. In addition, in this embodiment, the case 4 corresponds to a case according to the present invention, and the mat 5 corresponds to an insulating support member according to the present invention. Also, in this embodiment, the inner pipe 6 corresponds to an inner pipe according to the present invention, and the precious metal bands 10 corresponds to precious metal bands according to the present invention.

[Operational Effects of the Construction of the EHC according to this Embodiment]

In the EHC 1 according to the present invention, in the exhaust pipe 2 or in the case 4, condensed water may be generated due to condensation of the moisture in the exhaust gas. When the condensed water reaches from the inner wall surface of the case 4 up to the catalyst carrier 3 while transmitting through the inside of the mat 5 or the end faces thereof, the case 4 and the catalyst carrier 3 are short circuited to each other.

However, in this embodiment, the inner pipe 6 is inserted in the mat 5. In addition, the inner pipe 6 protrudes from the end faces of the mat 5. With the inner pipe 6 being formed in this manner, a flow of the condensed water from the inner wall surface of the case 4 to the catalyst carrier 3 in the inside of the mat 5 and on the end faces thereof is interrupted or blocked by the inner pipe 6. Accordingly, it is possible to suppress a short circuit between the case 4 and the catalyst carrier 3 through the condensed water.

Here, note that in this embodiment, the inner pipe 6 need not necessarily protrude from both the upstream side and the downstream side of the mat 5. For example, the construction may also be such that a protrusion portion of the inner pipe 6 is formed only at the upstream side of the mat at which an amount of generation of condensed water is more than that at the downstream side thereof.

Figure 4:
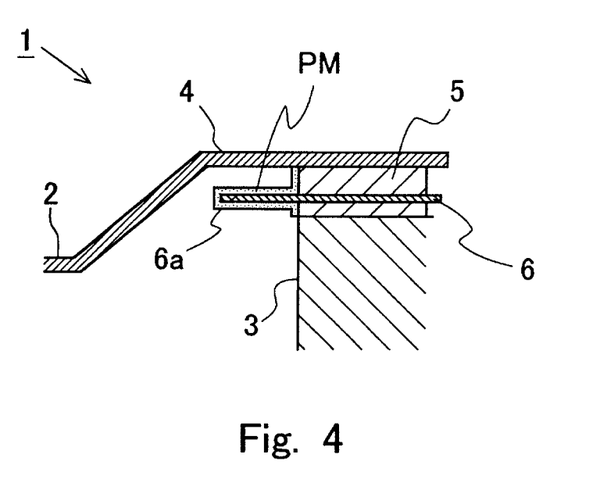
FIG. 4 is a view showing a state in which PM has been accumulated or deposited over the entire surfaces of an end face of a mat and a surface of a protrusion portion of the inner pipe.

In addition, in the EHC 1, the PM in the exhaust gas adheres to and accumulates or deposits on the end faces of the mat 5 and the protrusion portions 6a, 6b of the inner pipe 6. As a result, when the PM deposits over the entire surfaces of the end face of the mat 5 and the surface of the protrusion portion 6a (or 6b) of the inner pipe 6, there occurs a short circuit between the case 4 and the catalyst carrier 3 through the PM, as shown in FIG. 4.

However, in this embodiment, the protrusion portions 6a, 6b of the inner pipe 6 are formed with the precious metal bands 10 which extend around on the outer peripheral surfaces thereof. Then, the PM is oxidized and removed by the active oxygen which is generated by the precious metal bands 10. With this, the electrical insulation between the case 4 and the catalyst carrier 3 is suppressed from being reduced resulting from the PM.

Here, reference will be made to a mechanism of oxidation of the PM, while taking, as an example, a case in which the precious metal bands 10 are formed of Pt. In cases where the precious metal bands 10 are formed of Pt, when the temperature of the precious metal bands 10 rises due to the heat of the exhaust gas, active oxygen is generated from platinum oxide, as shown in the following equation (1). Then, the PM is oxidized by the active oxygen.

$$PtO_2 \rightarrow Pt^{4+} + 2O^{2-}$$ Equation (1)

Further, in cases where the precious metal bands 10 are formed of Pt, NOx in the exhaust gas is reduced by Pt, so that $NO_2$ is generated. The PM is oxidized also by the $NO_2$. Similarly, in cases where the precious metal bands 10 are formed of a platinum based metal (Rh, Pd, etc.) other than Pt, the PM is oxidized also by $NO_2$ which has been generated by the reduction of NOx in the exhaust gas.

Figure 5:
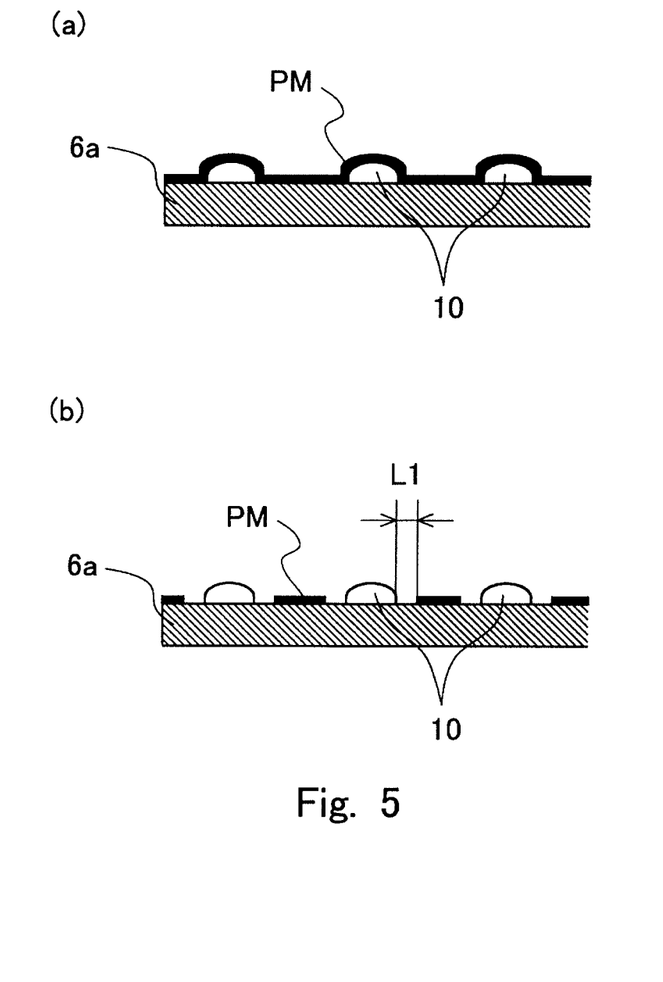
FIG. 5 is an image view showing a state in which PM has been deposited on the surface of the protrusion portion of the inner pipe, and a state in which the PM thus deposited has been oxidized, according to the first embodiment.

FIG. 5 is an image view showing a state in which PM has been deposited on the surface of the protrusion portion 6a of the inner pipe 6, and a state in which the PM thus deposited has been oxidized. FIG. 5(a) shows the state in which the PM has been deposited on the surface of the protrusion portion 6a of the inner pipe 6, and FIG. 5(b) shows the state at the time when the PM has been oxidized.

As shown in FIG. 5(a), the PM is deposited on the entire surface of the protrusion portion 6a of the inner pipe 6 on the surface, i.e., on the surfaces of the precious metal bands 10 and those portions of the protrusion portion 6a on which the precious metal bands 10 are not formed. Then, the PM thus deposited on the precious metal bands 10 is oxidized and removed by means of the active oxygen (in the case of Pt, $NO_2$ in addition thereto) generated in the precious metal bands 10.

Further, the active oxygen generated in the precious metal bands 10 also oxidizes PM deposited at locations which are slightly away from the precious metal bands 10. As a result, even if the PM remains unoxidized on the surface of the protrusion portion 6a of the inner pipe 6 at locations between the precious metal bands 10, it is possible to ensure a creepage distance between the PM and each of the precious metal bands 10, as shown by L1. In this embodiment, the precious metal bands 10 are formed on the outer peripheral surface of the protrusion portion 6a of the inner pipe 6 in a band-shaped fashion so as to extend around on the circumferential surface thereof, and hence it is possible to ensure such a creepage distance L1 over the entire circumference of the protrusion portion 6a of the inner pipe 6.

Moreover, by forming the plurality of precious metal bands 10 on the surface of the protrusion portion 6a of the inner pipe 6, a total sum of the creepage distances L1 obtained by oxidizing and removing the PM can be made longer. As a result, according to this embodiment, it is possible to suppress a reduction in the insulation between the catalyst carrier 3 and the case 4 resulting from the PM.

Here, note that in this embodiment, the number of the precious metal bands 10 formed on the surfaces of the protrusion portions 6a, 6b of the inner pipe 6 may be decided in such a manner that the total sum of the creepage distances L1 obtained by oxidizing and removing the PM is a distance capable to maintain the electrical insulation between the catalyst carrier 3 and the case 4 to a sufficient extent. In addition, the number of the precious metal bands 10 may not necessarily be plural as long as the electrical insulation between the catalyst carrier 3 and the case 4 can be maintained to a sufficient extent.

Figure 6:
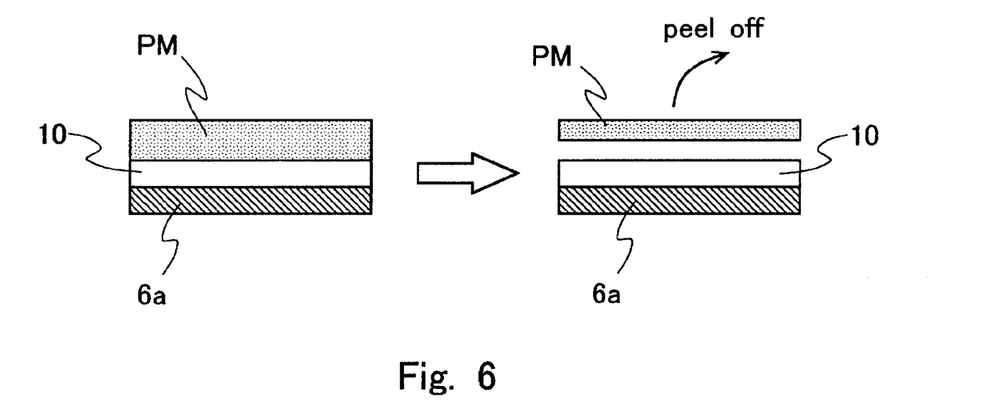
FIG. 6 shows a state in which PM has been deposited relatively thickly on the surface of the protrusion portion of the inner pipe according to the first embodiment.

In addition, FIG. 6 shows a state in which the PM has been deposited relatively thickly on the surface of the protrusion portion 6a of the inner pipe 6. Even in such a case, the PM at locations in contact with the precious metal bands 10 and at locations slightly away from the precious metal bands 10 is oxidized by active oxygen. At this time, the layer of the PM formed on the precious metal bands 10 is thick, and hence, if there exists any PM which the active oxygen generated in the precious metal bands 10 does not reach, that PM will remain on the surface of the protrusion portion 6a without being oxidized. However, the PM remaining in this manner tends to peel off easily. For this reason, the PM is exfoliated by the flow of the exhaust gas, as shown in FIG. 6. Accordingly, according to this embodiment, the entire layer of the deposited PM can be removed.

[Other Constructions]

Figure 7:
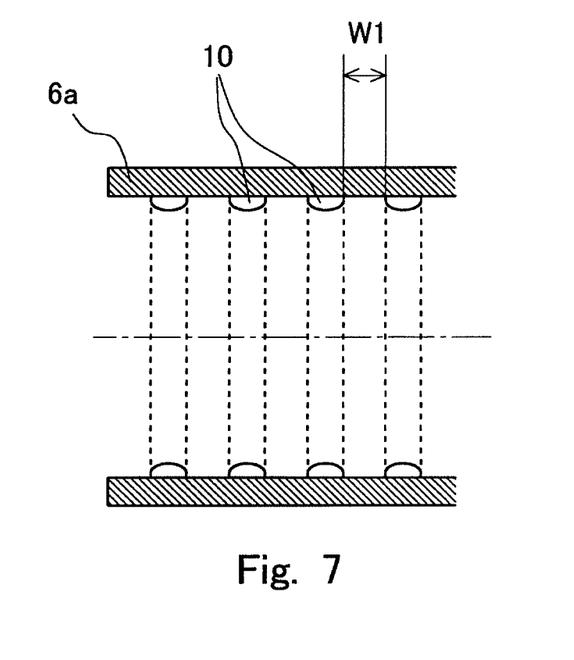
FIG. 7 is a view showing another construction of precious metal bands according to the first embodiment.

In this embodiment, a precious metal band(s) 10 may be formed on an inner peripheral surface(s) of a protrusion portion(s) of the inner pipe 6, as shown in FIG. 7. In this case, on the inner peripheral surface(s), a creepage distance for insulation can be ensured. Accordingly, the same effects as stated above can be obtained. In addition, the precious metal band(s) 10 may be formed on both the outer peripheral surface(s) and the inner peripheral surface(s) of the protrusion portion(s) of the inner pipe 6.

Figure 8:
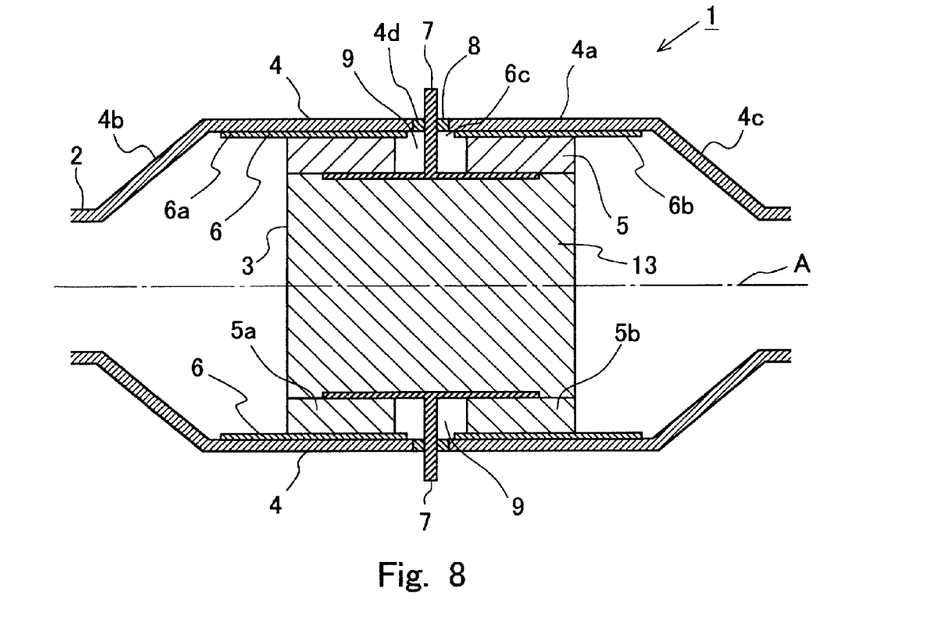
FIG. 8 is a view showing another construction of the electric heating catalyst (EHC) according to the first embodiment.

Moreover, in this embodiment, the inner pipe 6 is not inserted in the mat 5, but may be inserted or sandwiched between the outer peripheral surface of the mat 5 and the inner peripheral surface of the case 4, as shown in FIG. 8. Even in this case, the precious metal bands 10 can be formed on the inner peripheral surfaces of the protrusion portions 6a, 6b of the inner pipe 6.

Second Embodiment

Schematic Construction of the EHC

Figure 9:
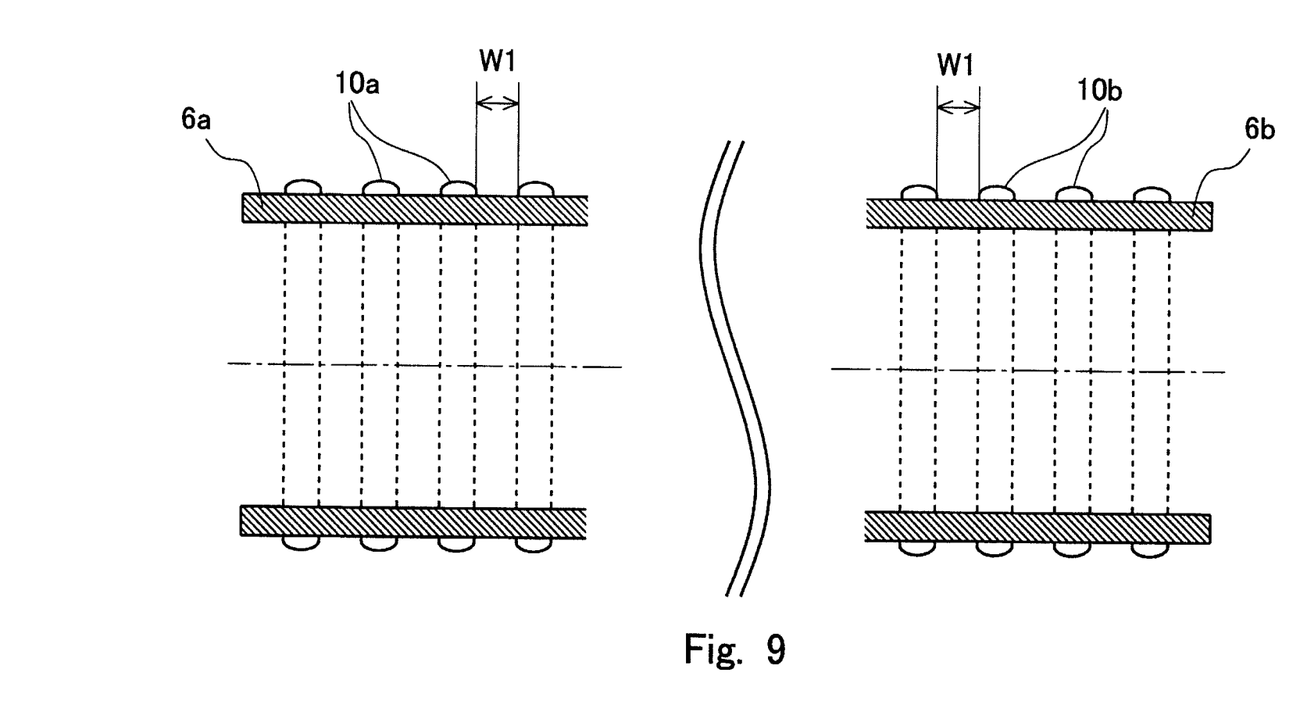
FIG. 9 is a view showing the schematic construction of protrusion portions at an upstream side and a downstream side of an inner pipe according to a second embodiment.

FIG. 9 is a view showing the schematic construction of protrusion portions 6a, 6b at an upstream side and a downstream side of an inner pipe 6 in an EHC 1 according to this second embodiment. In this embodiment, too, as in the case of the first embodiment, precious metal bands 10a, 10b are formed on the protrusion portions 6a, 6b at both the upstream side and the downstream side of the inner pipe 6. However, this embodiment is different from the first embodiment in that in this embodiment, the precious metal bands 10a formed on the upstream side protrusion portion 6a (hereinafter referred to as upstream side precious metal bands) and the precious metal bands 10b formed on the downstream side protrusion portion 6b (hereinafter referred to as downstream side precious metal bands) are formed of different precious metals, respectively. The construction of the second embodiment other than this is the same as that of the EHC according to the first embodiment.

In this embodiment, the downstream side precious metal bands 10b are formed of Ag, whereas the upstream side precious metal bands 10a are formed of a platinum based metal whose activity is higher than Ag. However, the combination of the precious metals which form both the precious metal bands 10a, 10b is not limited to this, but the upstream side precious metal bands 10a should just be formed of a precious metal which is higher in activity than a precious metal which forms the downstream side precious metal bands 10b.

[Operational Effects of the Construction of the EHC According to this Embodiment]

The temperature of the exhaust gas which flows into the EHC 1 is low as compared with the temperature of the exhaust gas which flows out of the EHC 1. This is because the temperature of the exhaust gas is caused to rise by reaction heat in the exhaust gas purification catalyst 13 in the inside of the EHC 1. When the temperature of the exhaust gas is low, PM is more difficult to be oxidized as compared with the case where the temperature of the exhaust gas is high. Therefore, in the inner pipe 6 of the EHC 1, the PM deposited on the upstream side protrusion portion 6a is more difficult to be oxidized as compared with that on the downstream side protrusion portion 6b.

Accordingly, in this embodiment, the downstream side precious metal bands 10b are formed of Ag, whereas the upstream side precious metal bands 10a are formed of a platinum based metal whose activity is higher than Ag. According to this, in the upstream side protrusion portion 6a, too, in which the temperature of the exhaust gas is low, the oxidization of PM can be facilitated by active oxygen. As a result, it is possible to suppress a reduction in the insulation between the catalyst carrier 3 and the case 4 resulting from the PM with a higher degree of probability.

Also, in other words, even if a precious metal, which is not as high in activity as that for the upstream side precious metal bands 10a, is used for the downstream side precious metal bands 10b, the PM deposited on the downstream side protrusion portion 6b can be oxidized and removed. Accordingly, in this embodiment, the downstream side precious metal bands 10b are formed of Ag which is less expensive than the platinum based metal. By so doing, it is possible to decrease the cost of the precious metal bands 10a, 10b, while suppressing the reduction in the insulation between the catalyst carrier 3 and the case 4 resulting from the PM.

DESCRIPTION OF THE REFERENCE SIGNS

1: electric heating catalyst (EHC)
3: catalyst carrier
4: case
5: mat
6: inner pipe
7: electrodes
9: electrode chamber
10: precious metal bands

The invention claimed is:

1. An electric heating type catalyst comprising:
   a heat generation element that is electrically energized to generate heat so that a catalyst is heated by the generation of heat;
   a case that receives said heat generation element therein;
   an insulating support member that is arranged between said heat generation element and said case for supporting said heat generation element and insulating electricity;
   an inner pipe that is a tubular member formed of a material which insulates electricity and which is more resistant to water permeation than said insulating support member, said inner pipe being arranged so as to be located between said heat generation element and said case, said inner pipe having an end protruding from an end face of said insulating support member into an exhaust gas; and
   a precious metal band that is formed on at least either one of an inner peripheral surface and an outer peripheral surface of that portion of said inner pipe which protrudes from the end face of said insulating support member into the exhaust gas, by coating thereon precious metal in a band-shaped manner so as to extend around on a circumferential surface thereof.

2. The electric heating catalyst as set forth in claim 1, wherein
   said precious metal band is formed in plurality on at least either one of the inner peripheral surface and the outer peripheral surface of that portion of said inner pipe which protrudes from the end face of said insulating support member into the exhaust gas, at intervals capable of ensuring electrical insulation between adjacent precious metal bands.

3. The electric heating catalyst as set forth in claim 1, wherein said inner pipe has its ends protruding into the exhaust gas from both the upstream side and the downstream side end faces of said insulating support member, respectively, and said precious metal band formed on that portion of said inner pipe which protrudes from the upstream side end face of said insulating support member is formed of a precious metal which is higher in activity than a precious metal which forms said precious metal band formed on that portion of said inner pipe which protrudes from the downstream side end face of said insulating support member.

4. The electric heating catalyst as set forth in claim 3, wherein said precious metal band formed on that portion of said inner pipe which protrudes from the upstream side end face of said insulating support member is formed of a platinum based metal; and said precious metal band formed on that portion of said inner pipe which protrudes from the downstream side end face of said insulating support member is formed of Ag.

\* \* \* \* \*